(12) United States Patent
Chen

(10) Patent No.: US 8,486,513 B2
(45) Date of Patent: Jul. 16, 2013

(54) OBJECT STRUCTURE HAVING PATTERNS OF REFRACTIVE VEINS THEREON

(75) Inventor: Sen-Yen Chen, Tainan (TW)

(73) Assignee: Teng Tsai Special Printing Co., Ltd., Tainan (TW)

( * ) Notice: Subject to any disclaimer, the term of this patent is extended or adjusted under 35 U.S.C. 154(b) by 361 days.

(21) Appl. No.: 13/013,004

(22) Filed: Jan. 25, 2011

(65) Prior Publication Data

US 2012/0189821 A1 Jul. 26, 2012

(51) Int. Cl.
  *B32B 3/00* (2006.01)
  *B32B 15/00* (2006.01)

(52) U.S. Cl.
  USPC ........... 428/164; 428/162; 428/163; 428/172; 428/207; 428/209; 428/458; 428/461

(58) Field of Classification Search
  USPC ................. 428/161, 162, 163, 164, 172, 203, 428/207, 209, 423.1, 458, 461, 480, 483, 428/515
  See application file for complete search history.

(56) References Cited

U.S. PATENT DOCUMENTS

| | | | | |
|---|---|---|---|---|
| 6,753,068 | B2 * | 6/2004 | Nakamura et al. | 428/172 |
| 7,608,320 | B2 * | 10/2009 | Chen | 428/203 |
| 2003/0161997 | A1 * | 8/2003 | Moran | 428/172 |

* cited by examiner

*Primary Examiner* — Donald J Loney
(74) *Attorney, Agent, or Firm* — Rosenberg, Klein & Lee

(57) ABSTRACT

An object structure having patterns of refractive veins thereon is provided, in which a heat insulated base plate capable of combining with object major body is provided, then a first base layer, a soft material layer, an aluminum film layer, and a second base layer being respectively build-up in this order thereon. Further, embossing process is conducted on the second base layer and then a pattern layer is printed thereon. In turn, a protection layer is overlaid on the pattern layer for protecting the colors thereof. Configuring like this, the heat insulated base plate having pattern design thereon can be combined integrally with the object major body by injection molding process, and pattern integrity can be ensured during injection molding by means of the heat-blocking effect obtained from the heat insulated base plate.

6 Claims, 3 Drawing Sheets

OBJECT STRUCTURE HAVING PATTERNS OF REFRACTIVE VEINS THEREON

BACKGROUND OF THE INVENTION

1. Field of the Invention

The present invention relates to an object structure having patterns of refractive veins thereon, more particularly to an object structure which can be combined with object integrally by injection molding and which has pattern integrity.

2. Brief Description of Prior Art

Along with rapid development of industrial technologies, products around the ambience of people have also been changing with each passing day and thus technical products are subconsciously integrated into our daily life. Some daily necessities cannot do without plastic products, as the application field thereof is widespread and plastic products can have diversification on shape, color and mix and match thereof. Hence, almost all industries cannot do without them.

However, there are some plastic products available on market having 3D shape or stereo vision, and plastic products having 3D shape is mainly manufactured by molding dies, and thus the products formed only have 3D feature with single color. If the products want to have pattern perception, artificial coloring should be conducted, or the printing method and its device for 3D object disclosed in Taiwanese Patent Gazette No. 526138 should be adopted to conduct thermal transfer process with thin film overlaying around. However, either artificial coloring or thermal transfer process is utilized, complicated processing and waste of manpower are encountered. Furthermore, products having stereo vision are mostly products having graphic design, only the part with pattern thereon has stereo vision effect, i.e., pattern having 3D level and stereo perception is firstly designed and then integral injection molding is conducted on the products. The contents disclosed in Taiwanese Patent Gazette No. 580462, 1279307, and 200916302 all belong to the abovementioned products having pattern with stereo vision, not products of 3D pattern.

Further, there is a hollow type 3D pattern product such as plastic magnet stuffs usually gifts provided from convenient stores, which is substantially made by vacuum thermoform process, i.e., pattern layer being printed on a plastic sheet first and then vacuum sucking process being conducted to form concave-convex veins corresponding to the shape of the pattern layer, or stamping process can be used alternatively to form concave-convex veins. The primary condition of the above two manufacturing methods requires that the pattern part of the product should be hollow and the thickness of the plastic product should be small, otherwise it is impossible to form the hollow type 3D pattern product. Moreover, the application field of the hollow type 3D pattern product is also limited to some items such as plastic magnet stuffs, stationery, calendar etc., evaluation is however not that good.

In a U.S. Pat. No. 7,608,320 B2 filed by the inventor of the present invention, the structure is essentially implemented to cup shape container. When making cup shape container, plastic material is substantially injected from the bottom into dies to overlay the pattern layer having 3D pattern thereon. As the substrate of the pattern layer is not directly contacted with the hot-melted plastic material, the temperature of the plastic material flowing into the dies and overlaying around the pattern layer is not as high as the temperature at the injection nozzle. Hence, hot-melted plastic material does not apply heat impact on the substrate of the pattern layer, and thus heat insulation function is not required in the substrate. However, when the pattern layer of product is placed on the end faces, the pattern layer in this case cannot work, as the substrate may be melted by the high-temperature of injected plastic material and thus the pattern layer is shattered into pieces. Therefore, implementation is not that good in this case.

In view of the above reasons, the inventor of the present invention hereby proposes a novel object structure having patterns of refractive veins thereon according to the research and improvement conducted on conventional structure and based on his abundant experience of R&D and manufacturing in relevant field, so as to achieve the goal of better implementation values.

SUMMARY OF INVENTION

The main object of the object structure having patterns of refractive veins thereon in this invention is to improve the disadvantages of imperfectness of conventional structure by integrally manufacturing the object and the heat insulated base plate having patterns thereon so as to achieve above object.

The above object and effectiveness of the object structure having patterns of refractive veins thereon in the present invention can be realized by the following technology.

An object structure having patterns of refractive veins thereon is provided in the present invention, in which a heat insulated base plate capable of combining with object is provided, then a first base layer, a soft material layer, an aluminum film layer, and a second base layer being respectively build-up in this order thereon; further, embossing process being conducted on the second base layer and then a pattern layer being printed thereon; in turn, a protection layer being overlaid on the pattern layer to protect the colors thereof. Configuring like this, integral injection molding can be conducted on the heat insulated base plate having pattern design on it with the object, and pattern integrity can be ensured during injection by means of the heat blocking effect of the heat insulated base plate.

The heat insulated base plate of the object structure having patterns of refractive veins thereon in the present invention is made of polystyrene (PS) or polypropylene (PP), while the first base layer and the second base layer are made of polyethylene terephthalate (PET) or polypropylene (PP), and the soft material layer is made of polyurethane (PU).

DETAILED DESCRIPTION OF PREFERRED EMBODIMENTS

The objects, the technical contents and the expected effectiveness of the present invention will become more apparent from the detailed description of the preferred embodiments in conjunction with the accompanying drawings.

Figure 1:
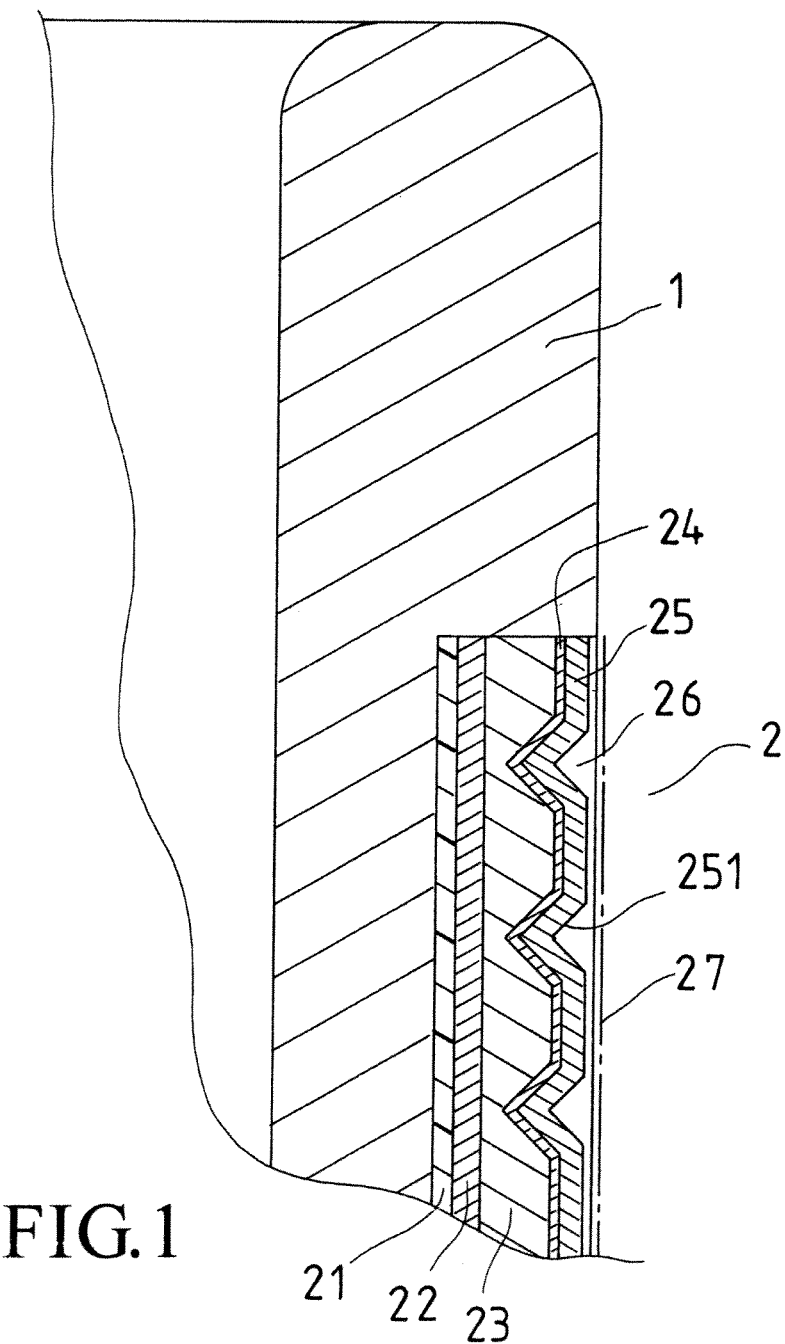
FIG. 1 is a schematic side view of the present invention.

Firstly referring to FIG. 1, the object structure having patterns of refractive veins thereon in the present invention has an object major body (1) which can be combined integrally with a pattern sheet (2) by injection molding process. The pattern sheet (2) includes:

a heat insulated base plate (21), which is a layer sheet capable of affixing and fusing with the object major body (1), capable of blocking the injection temperature of the object major body (1);

a first base layer (22) overlaid above the heat insulated base plate (21);

a soft material layer (23) provided over the first base layer (22), which can absorb pressure or stress variation;

an aluminum film layer (24) provided above the soft material layer (23), having embossed veins thereon;

a second base layer (25) provided above the aluminum film layer (24), having embossed veins (251) on its surface;

a pattern layer (26) placed over the second base layer (25), which can provide colors on the embossed veins (251) of the second base layer (25); and a protection layer (27), being a transparent layer overlaid above the pattern layer (26) for protecting the colors of the pattern layer (26).

Configuring like this, the heat insulated base plate (21) having pattern design thereon can be combined integrally with object major body (1) by injection molding process, and the pattern integrity can be ensured during injection molding process by means of the heat-blocking effect obtained from the heat insulated base plate (21).

Figure 2:
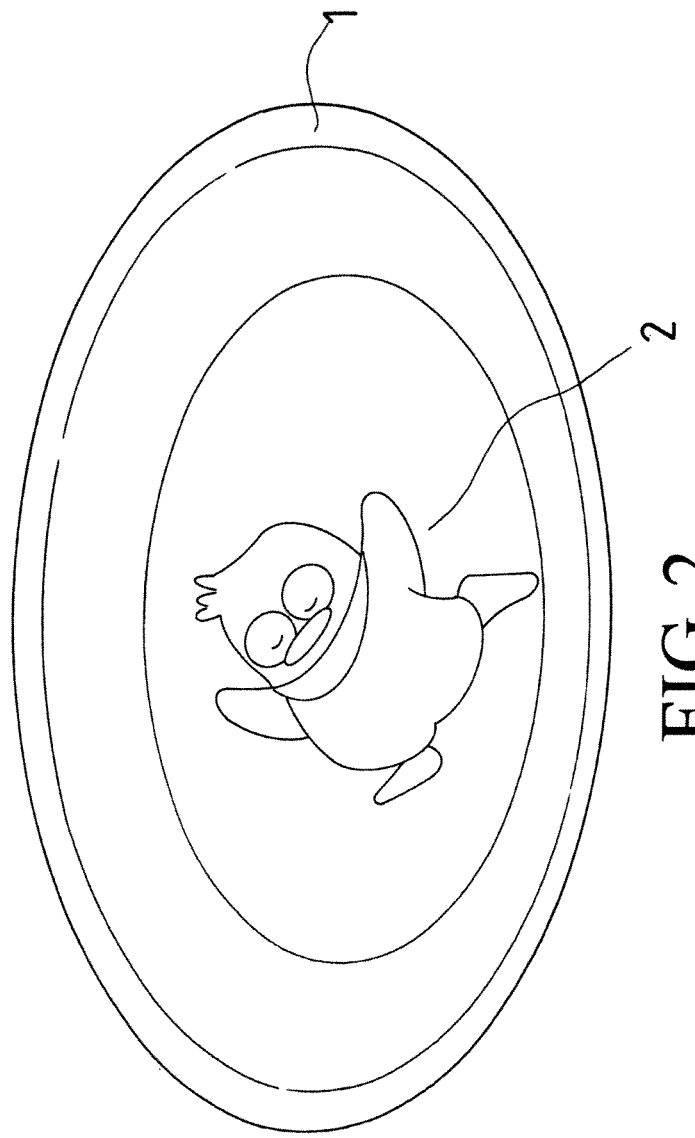
FIG. 2 is a schematic view showing the implementation status of the present invention.
Figure 3:
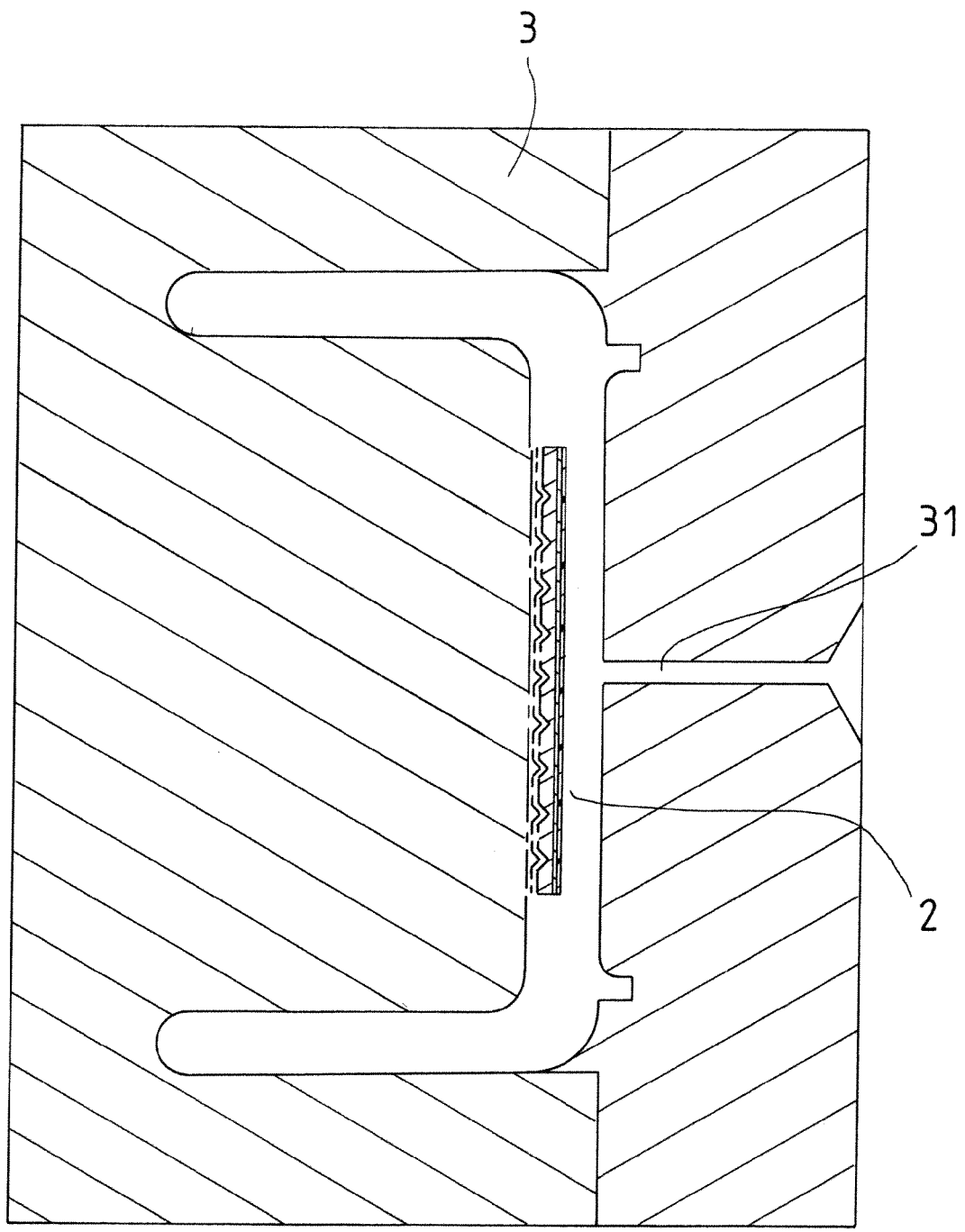
FIG. 3 is a schematic view showing the pattern sheet is combined with the object major body of the present invention.

Referring to FIGS. 1 to 3, when in usage, the object major body (1) and the pattern sheet (2) of the present invention are combined together by injection overmolding process in such a manner that the pattern sheet (2) is overlaid over the surface of the object major body (1) in a level way. As shown in FIG. 3, the pattern sheet (2) is placed inside the die (3) with the heat insulated base plate (21) opposite to the injection nozzle (31). When plastic material is injected, the heat insulated base plate (21) has the function of blocking instantaneous impact of high temperature so as to prevent the pattern sheet (2) from breaking. When conducting the above step, the pattern sheet (2) has to be made in advance so as to combine with the object major body (1). The pattern sheet (2) is provided with a first base layer (22), a soft material layer (23), aluminum film layer (24) having optical film effect, a second base layer (25) having embossed concave-convex veins thereon, a pattern layer (26) providing colors (by coating or printing) on the concave-convex veins (251), and a transparent protection layer (27) for protecting the pattern layer (26).

Furthermore, the heat insulated base layer (21) is made of polystyrene (PS) or polypropylene (PP), while the first base layer (22) and the second base layer (25) are made of polyethylene terephthalate (PET) or polypropylene (PP) and the soft material layer (23) the polyurethane (PU).

When conducting injection molding, the first base layer (22) is disposed over the heat insulated base layer (21) included in the pattern sheet (2), and then the soft material layer (23) is provided over the first base layer (22) by means of sticking, laminating, or coating methods. In turn, the aluminum film layer (24) is disposed on the rear face of the second base layer (25) by vacuum plating. Furthermore, the aluminum film layer (24) and the second base layer (25) are stuck on the soft material layer (23), and then embossing is in turn undertaken on the second base layer (25) to form the concave-convex veins (251), and colors are applied on the concave-convex veins (251) by printing or coating to form the pattern layer (26), and finally lacquer is coated on the pattern layer (26) to form the protection layer (27). Inasmuch as the soft material layer (23) is inside the second base layer (25), deeper concave-convex veins (251) can be formed during embossing so as to enhance 3D effect of the pattern sheet (2). When in implementation and usage, as shown in FIG. 1, the pattern sheet (2) is firstly molded, and then it is placed inside the dies to conduct injection overmolding with the object major body (1) so that the pattern sheet (2) is overlaid integrally on the surface of the object major body (1) to become level without any pattern shattering occurred.

Aforementioned embodiments and drawings are merely a part of embodiments of the present invention, not intended to restrict the present invention. Appropriate variations and modifications conducted without departing from the spirit and features of the present invention are considered to be still within the scope of the present invention.

Based on abovementioned constitution of elements and implementation, this invention is apparently has the following advantages, when comparing with prior art.

1. The object structure having patterns of refractive veins thereon can block instantaneous impact of high temperature during injection molding of plastic material by means of the heat insulated base plate, so that the pattern is not broken by high temperature.

2. In the object structure having patterns of refractive veins thereon of the present invention, embossing operation is conducted on the second base layer to form 3D concave-convex veins thereon, and then the aluminum film layer disposed above the soft material layer also has concave-convex veins thereon. Therefore, refractive veins can be highlighted by means of the refraction generated from the aluminum film layer having concave-convex veins thereon.

3. In the object structure having patterns of refractive veins thereon of the present invention, pattern is printed on the embossed veins so that pattern integrity can be maintained comparing to printing first before embossing of conventional design.

4. The object structure having patterns of refractive veins thereon of the present invention can be applied to various object having patterns on its surface, such as outer surface of container, box cover, box body, cup, case, display housing, inner or outer surface of various injection molded parts.

What is claimed is:

1. An object structure having patterns of refractive veins thereon, essentially having an object major body (1) which can be combined integrally with a pattern sheet (2) by injection molding process, said pattern sheet (2) comprising:

a heat insulated base plate (21), which is a sheet capable of affixing and fusing with said object major body (1), capable of blocking the injection temperature of said object major body (1);

a first base layer (22) overlaid above the heat insulated base plate (21);

a soft material layer (23) provided over said first base layer (22), which can absorb pressure or stress variation;

an aluminum film layer (24) provided above said soft material layer (23), having embossed veins thereon;

a second base layer (25) provided above said aluminum film layer (24), having embossed veins (251) on its surface;

a pattern layer (26) placed over said second base layer (25), which can provide colors on said embossed veins (251) of said second base layer (25); and a protection layer (27), being a transparent layer overlaid above said pattern layer (26) for protecting the colors of said pattern layer (26).

2. An object structure having patterns of refractive veins thereon as claimed in claim 1, wherein said soft material layer (23) is disposed over the first base layer (22) by means of sticking, laminating, or coating methods.

3. An object structure having patterns of refractive veins thereon as claimed in claim 1, wherein said heat insulated base plate (21) is made of polystyrene (PS) or polypropylene (PP).

4. An object structure having patterns of refractive veins thereon as claimed in claim 1, wherein said first base layer (22) is made of polyethylene (PET) or polypropylene (PP).

5. An object structure having patterns of refractive veins thereon as claimed in claim 1, wherein said second base layer (25) is made of polyethylene (PET) or polypropylene (PP).

6. An object structure having patterns of refractive veins thereon as claimed in claim 1, wherein said soft material layer (23) is made of polyurethane (PU).

* * * * *